UNITED STATES PATENT OFFICE.

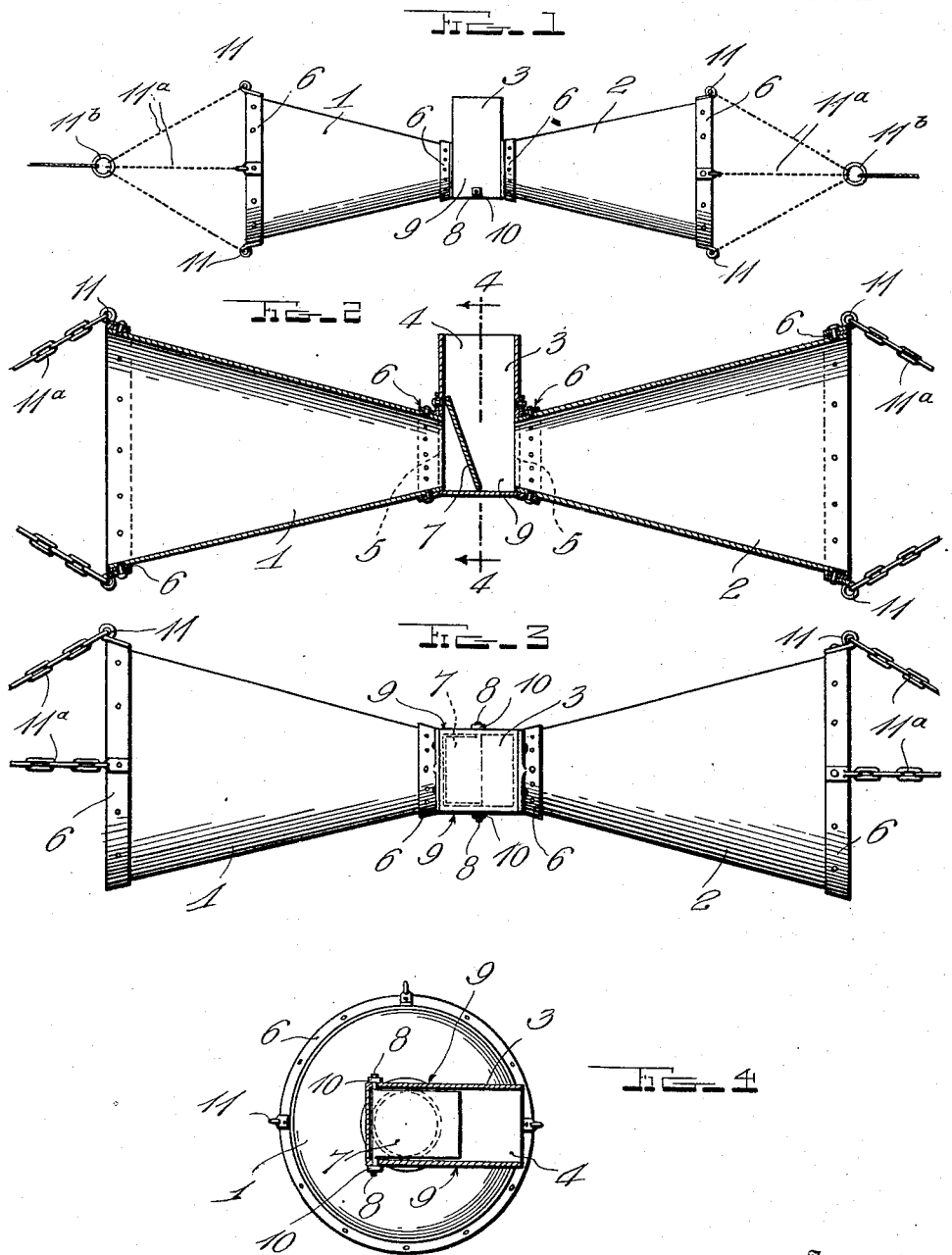

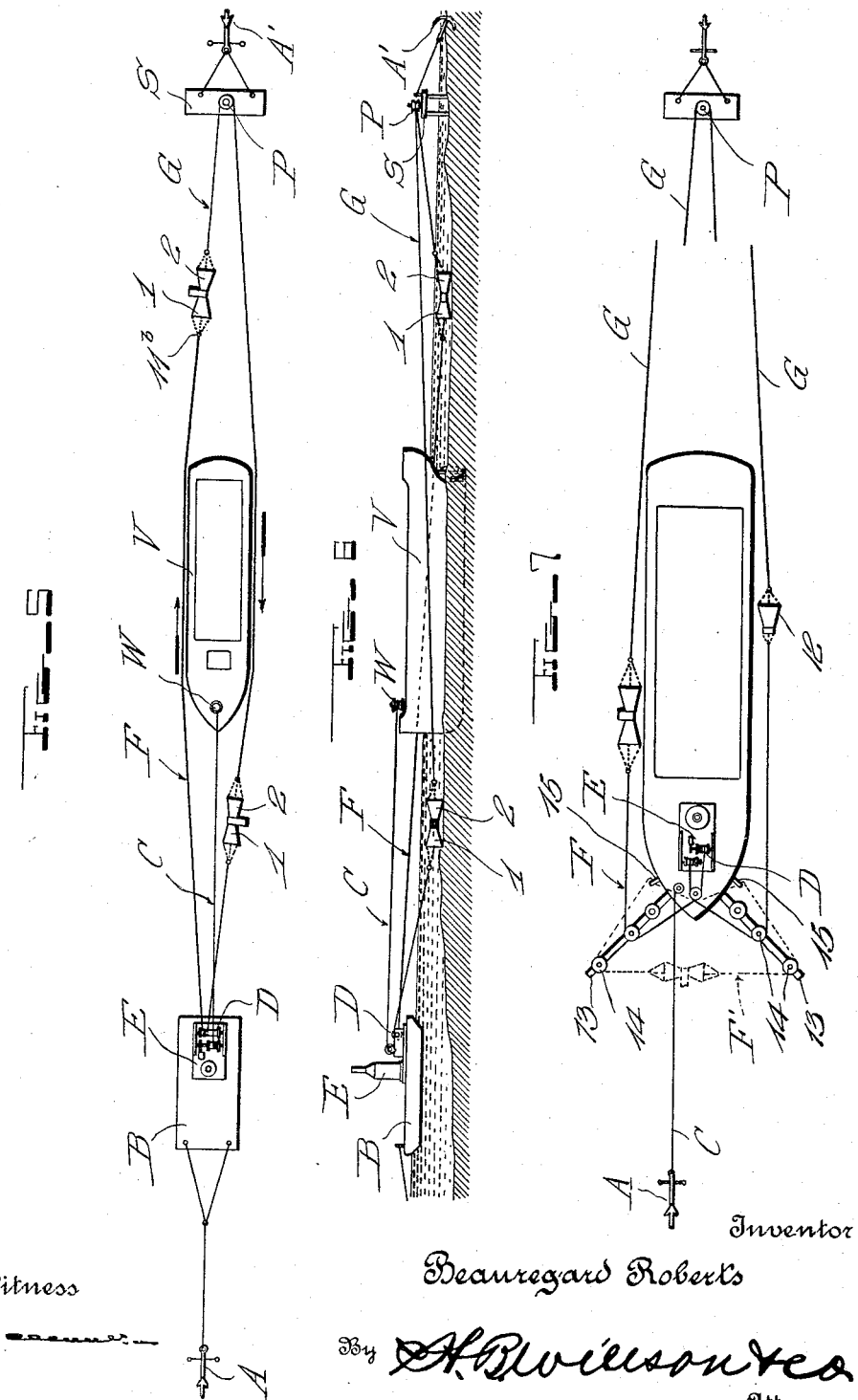

BEAUREGARD ROBERTS, OF MOBILE, ALABAMA.

DREDGE.

1,219,869.  Specification of Letters Patent.  Patented Mar. 20, 1917.

Application filed May 15, 1916. Serial No. 97,677.

*To all whom it may concern:*

Be it known that I, BEAUREGARD ROBERTS, a citizen of the United States, residing at Mobile, in the county of Mobile and State of Alabama, have invented certain new and useful Improvements in Dredges; and I do declare the following to be a full, clear, and exact description of the invention, such as will enable others skilled in the art to which it appertains to make and use the same.

This invention relates to improvements in dredges and means for operating the same, and the object is to provide a novel device of this character which may be effectively used for a great variety of purposes.

An additional object is to provide a dredge which, while very simply constructed, will be very efficient in operation and can be both inexpensively manufactured and operated.

With these and other objects in view, the invention resides in the novel features of construction, combination and arrangement of parts which will be hereinafter more particularly described and claimed and shown in the accompanying drawings wherein similar reference characters designate like parts throughout the several views.

In the accompanying drawings:

Figure 1 is a side elevation of one of my improved dredges;

Fig. 2 is a horizontal longitudinal section through the dredge;

Fig. 3 is a side view thereof;

Fig. 4 is a vertical transverse section taken on the plane of the line 4—4 of Fig. 2;

Fig. 5 is a plan view of a vessel showing my improved dredges in the act of removing sand from around the sides thereof;

Fig. 6 is a side elevation of the parts shown in Fig. 5;

Fig. 7 is a view similar to Fig. 5 illustrating a slightly different method of operating the dredges.

While I have illustrated the device as being used for removing the sand and like from around the sides of stranded vessels so as to more readily float the same, it will be understood that the dredge may also be used for digging ditches or the like, both below water and on dry land. The dredge proper comprises a pair of conical shaped members 1 and 2 which are open at their larger ends and disposed in longitudinal alinement with their small ends adjacent each other. Between the small ends of the members is disposed a substantially rectangular casing 3 open at one end as at 4 and provided with alined preferably circular openings 5 in its side walls, said openings 5 being surrounded by the small open ends of the members 1 and 2 which are secured to the casing 3 by any preferred means. The opposite ends of each of the members 1 and 2 are preferably surrounded by reinforcing bands 6 so as to strengthen the same, the bands on the outer ends of said members being also adapted to be used as cutting edges so as to readily scoop up the ground which is desired to be dug.

It will be seen that a continuous passageway is formed through the members 1 and 2 and through the casing 3 so that any material which enters one of the members will pass into the casing 3, and in order to discharge the same therefrom a swinging deflector plate 7 is provided, said plate having pintles 8 extending from opposite sides adjacent one end, whereby the same may be pivoted within said casing 3. The pintles extend through alined apertures in the top and bottom walls 9 of the casing 3 adjacent the closed end thereof, nuts or the like 10 being disposed upon the portions which extend beyond the casing so that the same may be held in operative position. Since the plate 7 is pivoted, it will effectively block the opening 5 in the member opposite the one which is actively engaged in excavating. In other words, if the cone member 1 is active the plate 7 is inclined toward the member 2 and covers the opening in the small end thereof which communicates with one of the openings in the wall of the casing 3. This movement of the plate is caused by the dirt or other material which enters the member 1, said material after striking the plate being deflected outwardly through the casing and through its open end 4. From the foregoing description it will be seen that it is immaterial which of the members is active, the dredge will operate to equal advantage. This is a great improvement, inasmuch as it permits the dredge to be continuously active and permits it to excavate when moved in either direction. While the device is preferably operated with the open end 4 of the casing disposed outwardly so that it may discharge in a horizontal plane, it is obvious that it may be used in any other position in which it may be successfully worked.

The top and side portions of each of the reinforcing bands which surround the outer large ends of the cone members 1 and 2 are provided with eyes 11, preferably three in number, to which suitable draft cables may be attached. The cables are secured to rings 11$^b$ which are carried by chains 11$^a$ fastened to said eyes 11. In the drawings, the improved dredge heretofore described is shown used for removing the sand from around the sides of a partially sunk and stranded vessel V, two dredges being preferably employed, one being on each side of said vessel. The power means for operating the dredges is preferably, although not necessarily, in the form of an engine E which may be either mounted upon the vessel itself, or upon a barge or the like B anchored adjacent the vessel, or it may be on the shore if the vessel is stranded near the land. When the engine is used on a barge as disclosed in Figs. 5 and 6, the latter is anchored at a point spaced from the bow of the vessel V by the anchor A, a cable C also being preferably run from said barge to a winch W on the vessel, thereby holding said barge steady and substantially in alinement with the vessel. A cable F is passed around the drums D of the engine and has its opposite ends attached to the rings 11$^b$ on the cone members 1 of a pair of my improved dredges, while the rings on the members 2 are secured to opposite ends of an additional cable G which is passed around a pulley P mounted upon a suitable support S anchored at A' in the rear of the stern of the vessel and in alinement therewith. It will be seen that when the engine rotates its drums to move the cables F and G in the direction of the arrows, the cone member 2 of the dredge on the starboard side of the vessel will be active, while the cone 1 of the dredge on the port side will come into use. The operation of the dredges will continue until they clear the sand from the vessel, or the engine is stopped, the sand and the like which is excavated by the members being discharged away from the sides of the vessel through the open ends of the casings 3. When the members have reached the limit of their movement in one direction, the direction of rotation of the drums is reversed, so that the starboard dredge will move away from the engine, while the other dredge moves toward the pulley P, and the opposite cone members will become active. The movement of the dredges along the sides of the vessel is continued until sufficient sand or the like has been removed to allow the same to be readily floated.

In digging a ditch or trench, the operation of the dredges is similar, the same being moved back and forth until it assumes the proper depth and width.

In Fig. 7 is illustrated the arrangement of parts as they will appear when my invention is used in connection with a vessel having the engine E mounted upon its deck. In this case, the bow of the vessel is held in position by the cable C upon one end of which the anchor A is attached, while the opposite end extends around the winch as is customary. In this case also the cable F has its intermediate portion engaged with the drums D of the engine E, while its ends are connected to suitable dredges either in the form of a double cone dredge hereinbefore described or a single cone dredge 12. The other ends of the dredges are connected to a cable G which extends around the pulley P as heretofore mentioned. It is necessary, however, when the engine is on the deck of a vessel, to guide the cable F so that the dredges will be spaced proper distance away from the sides of the vessel, this arrangement being accomplished by the provision of the outwardly extending arms 13 upon which a number of pulleys 14 are disposed, said arms being secured to the vessel in any preferred manner. A number of pulleys are provided so that proper positioning of the dredges may be obtained, it being obvious that the cable F is guided around one of the pulleys on each arm.

When the arms 13 are used, a dredge may be so connected with the engine by means of a cable F' as to clear the sand or mud away from the space around the front of the bow of the vessel, said cable F' being trained over a pulley on each arm and extended through eyes 15 secured to the sides of the vessel to the drums D. The single cone dredge 12 which is illustrated in this figure is substantially similar to one-half of the double cone dredges forming the members 1 and 2, except that the small end is closed, thus making it necessary to provide means for dumping the same.

From the foregoing description taken in connection with the accompanying drawings, it is obvious that I have invented an extremely simple dredge with means for operating the same which will effectively remove sand and other material from around the sides of a stranded vessel, and which may also be used for digging ditches and trenches.

I claim:

1. A dredge of the class described comprising a pair of tubular members open at each end and longitudinally alined, an outlet casing having the adjacent ends of said members secured thereto, the interior of said casing communicating with the interior of said members, and means for closing the outlet end of each of said members when the other is in operation.

2. A dredge of the class described comprising a pair of open ended conical-shaped members, the small ends of said members being connected together to form a continuous passageway therethrough, an outlet casing communicating with the interior of said members through which the material is adapted to be discharged, and means for operating said dredge.

3. A dredge of the class described comprising an outlet casing having an open end and alining openings in its sides, a pair of longitudinally alined open ended conical shaped members secured by their smaller ends to the opposite sides of said casing and surrounding said alined openings, whereby said members communicate with said casing, and a plate pivoted within said casing opposite its open end to close the smaller ends of either member when the other is in operation.

4. The combination with a vessel and power means thereon; of a pair of spaced arms extending from one end of the vessel, a plurality of pulleys on said arms, eyes on the opposite sides of said vessel adjacent said arms, a cable extending around a pulley on each arm and through said eyes and connected with said power means, a dredge carried by said cable and operable between said arms, a pulley spaced from said vessel, an additional cable passing around said last mentioned pulley and the pulleys on one of said arms and connected to said power means, and an additional dredge carried by the last mentioned cable and operable between one of said arms and the pulley spaced from said vessel.

5. The combination with a vessel and power means thereon, of a pair of spaced arms extending from one end of the vessel, a plurality of pulleys on said arms, eyes on the opposite ends of said vessel adjacent said arms, a cable extending around a pulley on each arm and through said eyes and connected with said power means, and a dredge carried by said cable and operable between said arms.

In testimony whereof I have hereunto set my hand in presence of two subscribing witnesses.

BEAUREGARD ROBERTS.

Witnesses:
   WATSON FAIRLEY,
   A. B. HOOGE.

Copies of this patent may be obtained for five cents each, by addressing the "Commissioner of Patents, Washington, D. C."